March 24, 1964     W. M. HANNEMAN     3,125,923
SCREW
Filed Nov. 26, 1962     2 Sheets-Sheet 1
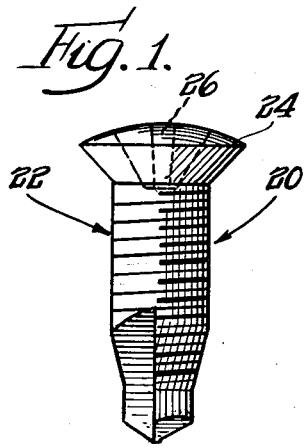
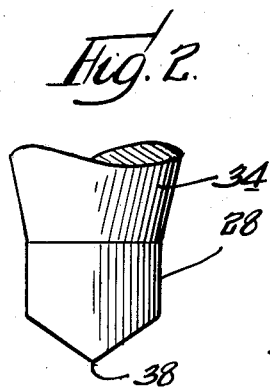
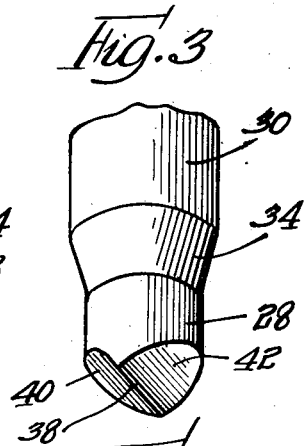
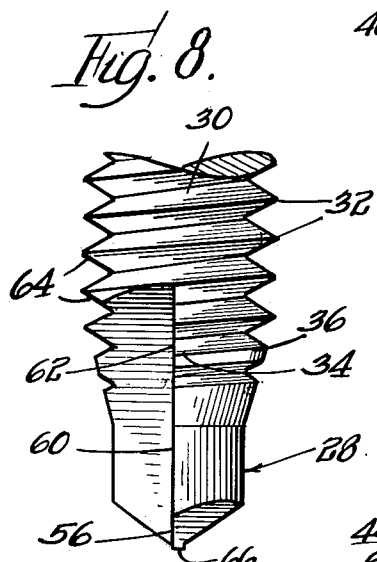
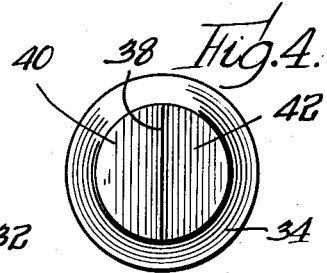
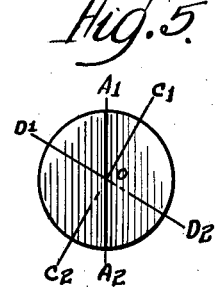
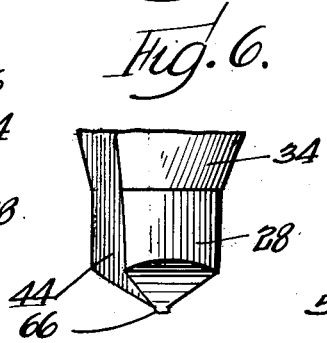
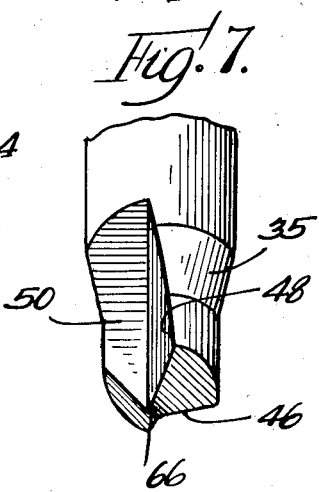
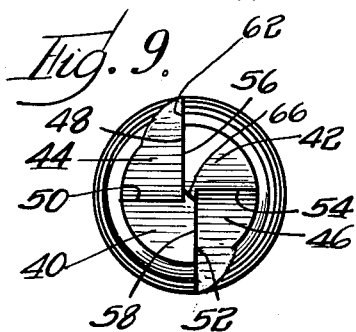
INVENTOR.
Walter M. Hanneman
BY
Olson & Trexler
attys.

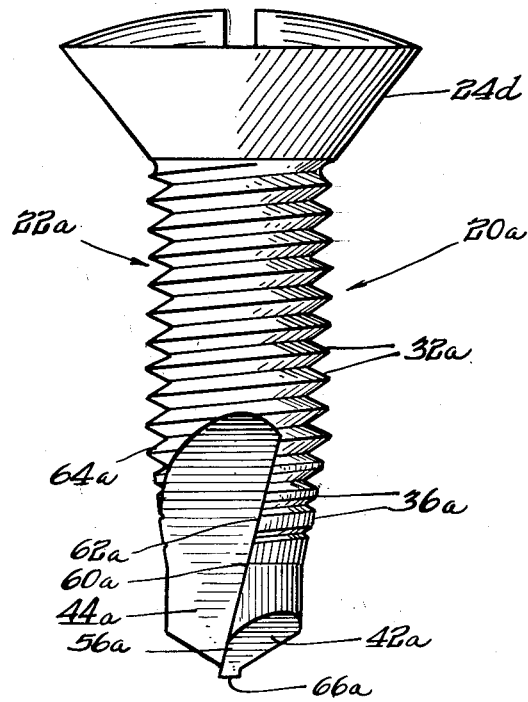
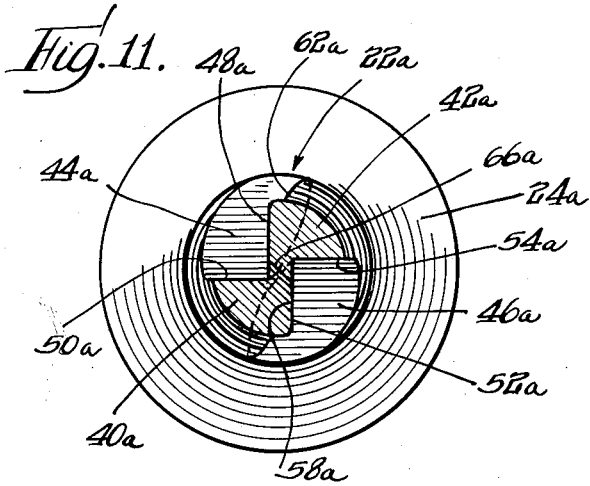

United States Patent Office 3,125,923
Patented Mar. 24, 1964

3,125,923
SCREW
Walter M. Hanneman, Wheaton, Ill., assignor to Illinois Tool Works Inc., Chicago, Ill., a corporation of Delaware
Filed Nov. 26, 1962, Ser. No. 240,181
5 Claims. (Cl. 85—47)

This application relates to a novel rotary threaded fastener, and more particularly to a novel screw. This is a continuation-in-part of my copending application Serial No. 819,488 filed June 10, 1959, now abandoned.

An important object of the present invention is to provide a novel screw which may be readily applied to a workpiece without the necessity of providing a predrilled or formed hole in the workpiece.

A further object of the present invention is to provide a novel thread cutting screw particularly suitable for application to relatively thin or sheet material workpieces and constructed so as to insure full thread engagement between the screw and the workpiece.

A more specific object of the present invention is to provide a novel screw which is constructed so as to cut or form a hole in a blank workpiece so as to eliminate any necessity for predrilling of the workpiece, which screw may further be constructed so that the hole provided thereby will be of a size which promotes substantially full depth engagement of the screw threads with the workpiece.

A further specific object of the present invention is to provide a novel screw of the above described type which is constructed so that it may be easily started into a blank workpiece without prior center punching of the workpiece.

Another object of the present invention is to provide a novel screw of the above described type capable of providing increased drilling speeds.

Other objects and advantages of the present invention will become apparent from the following description and the accompanying drawings wherein:

FIG. 1 is an elevational view showing a screw incorporating features of the present invention;

FIG. 2 is an enlarged fragmentary elevational view showing a screw blank in an early stage of a procedure which may be followed for producing screws incorporating features of the present invention;

FIG. 3 is a fragmentary perspective view showing the screw blank in the condition shown in FIG. 2;

FIG. 4 is an entering end view of the screw blank in the condition shown in FIGS. 2 and 3;

FIG. 5 is a diagrammatic end view similar to FIG. 4 and will be helpful in considering certain features of the construction of the present invention;

FIG. 6 is a view similar to FIG. 2 showing the screw blank turned 90° from the position shown in FIG. 2 and after an additional manufacturing step of providing slots therein has been performed;

FIG. 7 is a fragmentary perspective view showing the partially formed screw blank in the condition illustrated in FIG. 6;

FIG. 8 is an enlarged fragmentary elevational view similar to FIG. 1 showing features of the completed screw in greater detail;

FIG. 9 is an entering end view of the screw as shown in FIG. 8;

FIG. 10 is an elevational view showing a screw incorporating a modified form of the present invention; and FIG. 11 is an entering end view of the screw shown in FIG. 10.

Referring now more specifically to the drawings wherein like parts are designated by the same numerals throughout the various figures, a screw 20 incorporating features of the present invention comprises an elongated shank 22 having a head section 24 integral with a trailing end thereof. The head section is provided with a suitable slot 26 or other means for accommodating and cooperating with a tool, not shown, for turning the screw.

As shown in FIGS. 1, 8 and 9, the screw shank is provided with an entering end portion 28 which is unthreaded and which has a relatively small diameter. The end portion 28 is formed in the manner described in detail below so that it is provided with a pointed tip and cutting edges which enable it to drill through a blank workpiece. The shank 22 also includes a trailing portion 30 of substantial length. Helical thread convolutions 32 are integrally formed on the trailing portion 30 so that their inner or root diameter is similar to or, in other words, equal to or somewhat greater than the diameter of the entering end portion 28 while their outside or crest diameter is substantially greater than the diameter of the end portion. An intermediate shank portion 34 is provided between the entering end portion 28 and the trailing portion 30, and the thread convolutions are extended along the intermediate shank section. However, it will be noted that the thread convolutions 36 which are on the intermediate portion progressively decrease in height or, in other words, they have a progressively decreasing outside or crest diameter in a direction extending from the full depth thread convolutions 32 on the trailing shank portion 30 to the unthreaded entering end portion 28. As is discussed more in detail below, these tapering thread convolutions are interrupted so as to provide thread cutting edges so that the screw 22 is adapted both to drill a pilot hole in a workpiece and form complementary threads in the workpiece.

When manufacturing the screw 20, a tip of the entering end portion 28 may first be ground or otherwise formed so as to provide a ridge having a terminal edge 38 intersecting and perpendicular to the longitudinal axis of the screw shank and also having opposite flat side surfaces 40 and 42 inclined rearwardly from the edge 38 at equal angles as shown in FIGS. 2, 3, and 4. Then oppositely disposed generally longitudinally extending slots or recesses 44 and 46 are formed in the entering end and intermediate portions of the shank as shown in FIGS. 6 and 7. These recesses also extend slightly into the trailing portion 30 of the shank. The recess or slot 44 is defined by right angularly disposed surfaces 48 and 50 which are constructed and arranged in the manner described in detail below, and the recess or slot 46 is defined by similarly disposed surfaces 52 and 54. These surfaces are arranged so that the inner sections between the surfaces 48 and 52 and the tip surfaces 42 and 40 provide cutting edges 56 and 58. In addition, the intersection of the surfaces 48 and 52 with the peripheral surfaces of the entering end portion 28 and the intermediate shank portion 34 and the trailing end portion provide extensions of the cutting edges along the sides of the screw shank as shown best in FIG. 8 by the extensions 60, 62 and 64 of the tip cutting edge 56.

Referring particularly to the diagram shown in FIG. 5, it is seen that the line $A_1$—$A_2$ represents the tip or ridge edge 38. The recesses 44 and 46 are formed in the shank so that their side surfaces intersect the tip surfaces approximately along the lines $C_1$—$C_2$ and $D_1$—$D_2$ so that the tip cutting edges 56 and 58 are disposed for engagement with a workpiece while portions of the tip surfaces 40 and 42 behind the cutting edges are relieved so as to avoid interference with the workpiece. In this connection, it will be noted that the line $C_1$—$C_2$ is disposed so that the angle $A_1O$—$C_1$ is less than 45°. At the same time the line $D_1$—$D_2$ is disposed at an angle of 90° to the line $C_1$—$C_2$ so that the angle $D_1O$—$A_1$ is greater than 45°.

As a result of the fact that the surfaces 40 and 42 are originally flat, it will be appreciated that the line $C_1O$ is closer to the line $A_1O$ which is perpendicular to the shank axis then the line $D_1O$ whereby the line $C_1O$ is inclined rearwardly with the respect to the axis of the shank at an angle less than the rearward inclination of the line $D_1O$. Thus when the material of the shank within the angle $D_1O$—$C_1$ is cut away to provide the recess 44, the line $C_1O$ corresponds to the cutting edge 56 which, as indicated above, is located for engagement with the workpiece while the edge of the shank tip corresponding to the line $D_1O$ is relieved so as to avoid engagement with the workpiece. Of course, it is also understood that when the material within the angle $C_2O$—$D_2$ is cut away to provide the recess, the line $C_2O$ corresponds to the cutting edge 58.

It is to be noted that the recesses 44 and 46 are formed so that the cutting edges 56 and 58 are parallel to but slightly offset in opposite directions from the line $C_1$—$C_2$. As a result, these cutting edges pass on opposite sides of the axis of the shank so as to provide the tip portion of the shank with a small center projection or point 66 which extends beyond the cutting edges 56 and 58. This small point facilitates application of the screw to a blank workpiece and the starting of the aperture cutting or drilling operation in the workpiece without first preparing the workpiece by center punching or the like.

When applying the screw member 20 to a work structure, the screw member is forced against a blank workpiece and turned by means of any suitable tool, not shown. During the initial phase of this operation, the projecting point is relatively easily embedded in the work so as to prevent the screw from moving laterally from the desired point of application. Upon further turning of the screw, the cutting edges 56 and 58 engage the work and form an aperture therein having a diameter similar to that of the entering end portion 28 of the screw. As the screw passes into the aperture, the cutting edges along the side of the unthreaded entering end portion 28 serve to ream out the aperture whereupon the portions 62 and 64 of the cutting edges which traverse the tapering thread convolutions 36 and a portion of one of the full depth convolutions serve to form complementary thread convolutions in the workpiece for full depth engagement with the screw when the screw is fully applied.

FIGS. 10 and 11 show a slightly modified form of the present invention which is similar to the structure described above as indicated by the application of identical reference numerals with the suffix "a" added to corresponding elements. This embodiment differs in that the slots or recesses 44 and 46 are angularly positioned with respect to the longitudinal axis of the screw. More specifically, the surfaces 48a and 52a and thus, the cutting edges provided at the intersection of these surfaces with the periphery of the screw shank, are inclined rearwardly of a plane containing the longitudinal axis of the screw in order to provide the cutting edges with a positive rake angle. It has been found that this construction enables higher cutting speeds to be obtained. Furthermore, it has been found that a rake angle of about 15° is preferable in order to provide a construction which may be readily manufactured and which increases the cutting or drilling speed and is, at the same time sufficiently strong or rugged. However, it is to be understood, that certain features of the present invention may be used to advantage in screws having substantially different rake angles.

While the preferred embodiments of the present invention have been shown and described herein, it is obvious that many structural details may be changed without departing from the spirit and scope of the appended claims.

The invention is hereby claimed as follows:

1. A drilling and thread cutting screw of the type described comprising an elongated shank, and means at one end of said shank cooperable with a tool for turning the screw, said shank including an entering end portion having a first predetermined diameter, said entering end portion having a centered tip about the longitudinal axis of the screw and comprising a terminal ridge edge intersecting and substantially perpendicular to the longitudinal axis of the shank with symmetrically disposed substantially flat side surfaces on each side of said terminal ridge edge each diverging angularly outwardly and each intersecting said shank intermediate the terminal ridge edge and said means for turning the screw, said shank including a trailing portion having a plurality of integral and complete thread convolutions with the greatest diameter of the threads being greater than the diameter of the predetermined diameter at the entering end portion, said shank including an intermediate threaded portion joining said entering end and training portions and having a progressively increasing diameter from said entering end portion to said trailing portion, said entering end portion, said intermediate portion and part of said trailing portion of the shank having a pair of oppositely disposed substantially longitudinally extending slots therein respectively defined by first and second side surfaces disposed substantially at right angles to each other and having intermediate uninterrupted shank portions between them to provide opposed bearing surfaces which afford strength to the slotted screw shank and assure sufficient bearing surface for efficient drilling and thread cutting action, said first side surfaces of said slots respectively being parallel to and offset from a plane containing the longitudinal axis of the shank, said plane being equidistant from cutting edges provided at the intersections of said first side surfaces of said slots and said symmetrically disposed substantially flat divergent side surfaces in the vicinity of said pointed tip, the cutting edges so provided being disposed at an angle of less than 45° to said terminal ridge edge thereby providing a relief behind said cutting edges to assure their aggressive exposure as they are exposed to a workpiece, each of said first surfaces of said slots extending from the threaded shank periphery radially into and beyond said terminal ridge edge and intersecting both of the symmetrically disposed flat side surfaces at opposite sides of said terminal ridge edge, said pointed tip presenting a small centrally located axially extending projection including the aforementioned terminal edge together with portions of said flat side surfaces on either side thereof for initially engaging and removing material from a workpiece, and said first side surfaces of said slots providing the cutting edges radially outwardly of said point portion to the first predetermined diameter of the entering end portion of the screw as well as the edges along the intermediate and trailing threaded shank portions to effect cutting of a thread in the complementary workpiece aperture previously drilled.

2. A screw, as defined in claim 1, which includes a part of said integral thread convolutions extending along said intermediate shank portion and progressively decreasing in height from said trailing portion and terminating short of said entering end portion, said first sides of said slots completely traversing said intermediate portion and extending into said trailing portion.

3. A screw of the type defined in claim 1 wherein the pair of slots provided in the shank remove approximately 180° of the peripheral surface of said screw shank in cross section at the tip or terminal end of the screw and of the intermediate threaded portion of the shank, the remaining portions of the periphery of the screw serving to act as guides to assure bearing surfaces to facilitate the drilling and threading efficiency of the screw product.

4. A drilling and thread cutting screw of the type described comprising an elongated shank, and means at one end of said shank cooperable with a tool for turning the screw, said shank including an entering end portion having a first predetermined diameter, said entering end portion having a centered tip about the longitudinal axis of the screw and comprising a terminal ridge edge intersecting and substantially perpendicular to the longitudinal axis of the shank with symmetrically disposed substantially flat side surfaces on each side of said terminal ridge edge each diverging angularly outwardly and each intersecting said shank intermediate the terminal ridge edge and said means for turning the screw, said shank including a trailing portion having a plurality of integral and complete thread convolutions with the greatest diameter of the threads being greater than the diameter of the predetermined diameter at the entering end portion, said shank including an intermediate threaded portion joining said entering end and trailing portions and having a progressively increasing diameter from said entering end portion to said trailing portion, said entering end portion, said intermediate portion and part of said trailing portion of the shank having a pair of oppositely disposed substantially longitudinally extending slots therein respectively defined by first and second side surfaces disposed substantially at right angles to each other and having intermediate uninterrupted shank portions between them to provide opposed bearing surfaces which afford strength to the slotted screw shank and assure sufficient bearing surface for efficient drilling and thread cutting action, said first side surfaces of said slots respectively being inclined at an angle with respect to a plane containing the longitudinal axis of the shank with the angular inclination of said first side surfaces being such that the portion of the first side surface of each of said slots located in the trailing portion of the shank lies on a line traversing the said plane at an acute angle intermediate the tip portion of the screw and the means provided at the other end of the shank for turning the screw, cutting edges located at the intersections of said first side surfaces of said slots and said symmetrically disposed substantially flat divergent side surfaces in the vicinity of said pointed tip, the cutting edges so provided being disposed at an angle of less than 45° to said terminal ridge edge thereby providing a relief behind said cutting edges to assure their aggressive exposure as they are exposed to a workpiece, each of said first surfaces of said slots extending from the threaded shank periphery radially into and beyond said terminal ridge edge and intersecting both of the symmetrically disposed flat side surfaces at opposite sides of said terminal ridge edge, said pointed tip presenting a small centrally located axially extending projection including the aforementioned terminal edge together with portions of said flat side surfaces on either side thereof for initially engaging and removing material from a workpiece, and said first side surfaces of said slots providing the cutting edges radially outwardly of said point portion to the first predetermined diameter of the entering end portion of the screw as well as the edges along the intermediate and trailing threaded shank portions to effect cutting of a thread in the complementary workpiece aperture previously drilled.

5. A screw, as defined in claim 4, wherein said first side surfaces are inclined at an angle of about 15°.

References Cited in the file of this patent

UNITED STATES PATENTS

| | | |
|---|---|---|
| 2,255,997 | Hanneman | Sept. 16, 1941 |
| 2,354,985 | Davis | Aug. 1, 1944 |
| 2,479,730 | Dewar | Aug. 23, 1949 |
| 2,977,828 | Strickland | Apr. 7, 1961 |